Patented Aug. 7, 1951

2,562,878

UNITED STATES PATENT OFFICE 2,562,878

PROCESSES FOR BREAKING EMULSIONS

Charles M. Blair, Jr., Webster Groves, Mo., assignor to Petrolite Corporation, Ltd., Wilmington, Del., a corporation of Delaware No Drawing. Application January 13, 1949,
Serial No. 70,811

9 Claims. (Cl. 252—340)

In its broadest aspect, the present invention relates to a process for resolving emulsions of the water-in-oil type. One phase of the present invention relates to a process for resolving petroleum emulsions of the water-in-oil type, and is concerned specifically with the application of a new class of chemical compounds which function as emulsion-breaking reagents.

Thus, an important aspect of the present invention is the provision of an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

It also provides an economical process for resolving various other water-in-oil emulsions encountered in nature or industry, such as gas tar emulsions, tar sand oil emulsions, emulsions encountered in manufacture of antibiotic agents, emulsions encountered in the sweetening or caustic washing of hydrocarbons, etc. In its broadest aspect, the present process is concerned with the breaking of emulsions containing an aqueous (hydrophile) phase and a hydrophobic phase, in which the latter is the continuous phase.

Demulsification, as contemplated in the present application, includes the preventive step of commingling the demulsifier with the aqueous component which would or might subsequently become either phase of an emulsion in the absence of such precautionary measure. Similarly, such demulsifier may be mixed with the hydrophobic or organic component.

The products or compounds which I have discovered to have utility as demulsifiers, as well as for other processes to be mentioned later, are a class of surface- or interfacially-active polyesters, characterized by the presence in the polyester of a substantial proportion of alkylene ether glycol residues.

These polyesters, although derivable by a number of syntheses, are best prepared by direct condensation of a polybasic organic acid and a glycol, and are most readily described by consideration of the reactants employed to obtain them by such condensation. The term "condensation" or "condensation polymer" used herein, is employed in the sense defined by W. H. Carothers, Journal of American Chemical Society, 51, 2548 (1929). A condensation polymer was defined by Carothers as one in which the structural unit lacks certain atoms present in the monomer or monomers from which the polymer is formed. The present products, therefore, may be considered as condensation polymers, since they may be derived by an esterification reaction between a polybasic acid and a glycol, with a resultant evolution of water. They constitute a special kind of polymeric ester having unusual surface-active properties, as hereinafter described.

It is well known that when a polybasic acid, and more specifically, a polycarboxy acid, such as, for example, adipic acid, is reacted with a glycol, such as, for example, hexamethylene glycol, a mixture of polyesters of varying molecular weights results. This reaction is generally written:

$n\text{HOOC.C}_4\text{H}_8.\text{COOH}+n\text{HO.C}_6\text{H}_{12}.\text{OH}\rightarrow$
$\text{H}[-\text{OOC.C}_4\text{H}_8.\text{COO.C}_6\text{H}_{12}-]n\text{OH}+(2n-1)\text{H}_2\text{O}$ In actual practice, the polymeric ester product consists not of a single material, compound or ester, but of a mixture of co-generic polyesters containing small amounts of unreacted monomers. The number-average molecular weight of the product depends upon the conditions and extent of reaction, increasing with the degree of esterification and loss of water of reaction. It has been shown that the actual content of the various cogeners in the polyester product may be estimated from the number-average molecular weight (see e. g., P. J. Flory, Chemical Review, 39, 137 (1946)).

In the preparation of polyesters, including those employed in the present invention, it is not necessary to employ equal molal proportions of polybasic acid and glycol. However, when unequal proportions of the reactants are employed, the degree of polymerization or average molecular weight of the polyester product will generally be less, for given reaction conditions, than where equal molal proportions are employed. This effect results from the formation of end groups derived from the reactant in excess, and is greater the further the proportion of reactants is from equality. In this connection it should be pointed out that, regardless of the proportions of reactants used, the polymeric product will contain cogeners of varying end group composition. As a simple example, let us consider a dibasic acid reactant, represented by $X(COOH)_2$, and a glycol reactant, represented by $Y(OH)_2$. Then the various polyesters in the product may be represented by the following formulae, which show the three different types of end groups appearing in the cogeners:

$$HO[-Y'X'-]_p.COOH$$
$$HO[-Y'X'-]_p.Y.OH$$
$$HOOC.X[-Y'X'-]_p.COOH$$

Here $p$ is a whole number, generally less than 40, and between about 4 and 20 in the preferred products of this invention. $X'$ and $Y'$ in these formulae are residues of $X.(COOH)_2$ and $Y(OH)_2$ joined by ester linkages. Where the polybasic acid contains three or more carboxyl groups, the formulae representing the various polyester products are, of course, more complex, but one still obtains three types of products, from the standpoint of end-group composition, similar to those shown for the simplified case.

Suitable polycarboxy acids for use in preparing the present demulsifiers, include the commonly available organic dicarboxy and polycarboxy acids which are resistant to decarboxylation and pyrolysis under the usual esterification conditions. Of particular value and interest for the preparation of the present products, are the dicarboxylic acids, such as the aliphatic dicarboxylic acids: oxalic, malonic, succinic, glutonic, adipic, pimelic, azelaic, sebacic, maleic, fumaric, diglycollic, ethylene bisdiglycollic, citroconic, itaconic, dimeric fatty acids and the like. These and similar dibasic acids are easily reacted with the glycols specified below to yield linear polyesters. Carbonic acid is another suitable acid reactant, but is best employed as its diester, such as diethyl carbonate, with which polyesters are formed by ester interchange and evolution of the low boiling alcohol. Likewise, any of the polybasic acids can be used in the form of esters of low boiling monohydric alcohols. Also, the acid anhydrides, where they exist, may be used in place of the polybasic organic acid.

Other readily usable dibasic acids include phthalic acid, terphthalic acid, isophthalic, and adducts of maleic acid with various unsaturated hydrocarbons, such as diisobutylene, butadiene, retene, α-pinene and similar.

Organic acids having a functionality greater than two may also be employed to obtain polyesters suitable for use in the present process. Where such acids are used, it is necessary to control, rather carefully, the reaction conditions and/or proportions of acid and glycol to avoid the formation of insoluble gel-like or rubbery polyester products. Examples of suitable acids of higher functionality, include aconitic acid, hemimellitic acid, trimellitic acid, acids obtained from brown coal, maleic acid adducts of linoleic acid, and the like.

One of the glycol reactants required in the preparation of the present reagents, is an alkylene-ether glycol, preferably one containing one, two or three ether oxygens in the molecule, but which may contain as many as 25 to 30 ether oxygens, and in which the alkylene radical contains less than 10 carbon atoms, and preferably less than 6 carbon atoms. Examples of such glycols include diethylene glycol, di-1,2-propylene glycol, di-1,3-propylene glycol, di-1,2 butylene glycol, triethylene glycol, tetraethylene glycol, nonaethylene glycol, tripropylene glycol, tetrapropylene glycol, polypropylene glycol, of 2000 molecular weight, di-deca-methylene glycol, ethylene-propylene glycol, propylene-butylene glycol, and the like. The term "ethylene-propylene" glycol is intended to define a mixed alkylene-ether glycol, such as $$HO.C_2H_4.O.C_3H_6.OH$$

Where glycols of this type are prepared from a mixture of glycols, or, for example, by reaction of mixed alkylene oxides with a glycol to form higher molecular weight glycols, the exact location of the constituent alkylene groups is not readily defined. However, such heteroether glycols (sometimes referred to as heteric) are quite suitable for use in preparing the reagents of the present process. One may also employ a mixture of polycarboxylic acids, if desired.

I have discovered that, in order to obtain polyester products of sufficient surface-activity, one must employ the above described ether glycols in the preparation to the extent of at least about one-third of the total moles of glycol used. In addition to the ether glycols, but not in excess of about twice the number of moles of ether glycol, one may employ in the esterification other glycols capable of esterification at both hydroxyl groups to yield polymeric esters. Such glycols will be those containing two primary or secondary hydroxyl groups, or one primary and one secondary hydroxyl group. To avoid loss of surface-active or demulsification properties in the desired polyester product, the glycol employed should contain no more than about 20 carbon atoms per molecule. Examples of such glycols which may be used in combination with the ether glycols include: Ethylene glycol, 1,2-propylene glycol, 1,3-propylene glycol, 1,2-butylene glycol, 2-methyl-1,3-pentanediol, 1,5-pentanediol, hexamethylene glycol, octamethylene glycol, 12-hydroxy stearyl alcohol, and similar.

As suitable glycols of this latter type, it is not intended to include various pseudoglycols, such as glyceryl monoester, or other tri- or polyhydric alcohols, in which all but two hydroxyl groups have been esterified.

As previously stated, the demulsifiers of the present process must contain residues of alkylene ether glycols to the extent of at least one-third of all the glycol residues present in the polyester. However, they may be prepared entirely from such alkylene-ether glycols, to the exclusion of other types of glycols. The polyesters of greatest interest are those prepared from nearly equivalent amounts of polybasic acid and glycol, but considerable departure from equivalence still yields valuable demulsifiers. However, for most practical purposes, the preferred polyesters are those in which the ratio of equivalents of polybasic acid to equivalents of glycol is in the range of 0.5 to 2.0.

The preparation of the polyesters used herein is readily carried out by direct reaction of acids and glycols, using conventional esterification procedure. The temperature of the reaction may conveniently be held at from about 100° C. to 275° C., or thereabouts. Usually, where the glycol or acid reactants are not too low boiling to permit it, I prefer to carry out the esterification under atmospheric pressure at about 200° C. The use of esterification catalysts, such as sulfuric acid, toluene sulfonic acid, β-camphor sulfonic acid, sodium hydroxide, etc., leads to faster esterification. Passage of an inert gas through the reaction mixture is also beneficial. $CO_2$ acts as both a catalyst for the reaction and as an entraining gas for water vapor.

The polyesters of greatest interest in the present process appear to be those having molecular weights within the range of about 1,000 to 10,000, and particularly those having molecular weights between about 1,500 and 4,000. Average molecular weights are conveniently determined by titration of the acidic end groups in the polyester mixture, as described by P. J. Flory, Journal of American Chemical Society, 62, 1057 (1940), although other procedures such as the viscosity method, cryoscopic methods, or ebullioscopic methods may be used.

The following table gives a few examples of polyester preparations. In this table are shown the reactants and their proportions, the catalyst used, the reaction temperature, and in most cases, the average molecular weight of the product after various times of heating, as determined by titration of acidic end groups. Also shown is the degree of polymerization, DP, which is the number of monomer acid or glycol residues in the polyester having an equivalent weight equal to the average molecular weight found. The DP value is calculated from the relation:

$$DP = \frac{MW - 18}{M_1 + M_2 - 36}$$

where MW is the observed average equivalent weight of the polymer, $M_1$ is the molecular weight of the glycol reactant (or average molecular weight of the various glycols used), and $M_2$ is the molecular weight of the polybasic acid reactant (or average molecular weight of the various acids used).

The polyester products used herein, such as those described in the above table, are generally viscous, oil-like fluids varying from colorless to a dark amber color. A few are soft, semi-crystalline solids at room temperature. They are, for the most part, only slightly soluble in aliphatic hydrocarbons, such as hexane, kerosene and the like, but are soluble in aromatic solvents, such as benzene, or in mixtures of aromatic solvents and lower alcohols. These products are also generally insoluble in water, but in some instances, will form colloidal dispersions or emulsions in water or aqueous solutions.

The surface-active property of the polyesters of the kind with which we are concerned is demonstrated by their ability to lower the surface-tension of water, where they show at least some slight solubility in water, or their general ability to bring about a decrease of the interfacial tension between a hydrocarbon liquid and water. Very small concentrations, e. g., 0.01%, of the present polyesters in a hydrocarbon liquid or in water are sufficient to cause an easily-measurable decrease in the interfacial tension between the hydrocarbon and the water phases. In practice, such surface-activity can be determined by measurement of the interfacial tension between water and, e. g., a white mineral oil, using an instrument such as the Du Nouy interfacial tensiometer. After such measurement, a small amount of polyester may be introduced into the oil or water phases, the liquid is stirred gently, and the interfacial tension again determined. A decrease of the interfacial tension by several dynes per centimeter, and sometimes, by as much as 15 to 20 dynes per centimeter, will be observed.

*Examples of polyesters*

| Preparation Number | Acid Reactants | Moles of Acid | Glycol Reactants | Moles of Glycols | Catalyst | Temp. of Reaction (°C.) | Reaction Time (Hours) | Average Equivalent Weight | DP |
|---|---|---|---|---|---|---|---|---|---|
| 1 | Adipic Acid | 1.00 | Triethylene Glycol | 1.03 | $CO_2$ | 200 | 7 | 1,115 | 4.2 |
| 2 | | | | | | | 12 | 1,795 | 6.8 |
| 3 | | | | | | | 18 | 2,690 | 10.3 |
| 4 | ----do---- | 1.00 | ----do---- | 1.03 | 0.1% p-toluene sulfuric acid. | 200 | 6 | 1,785 | 6.8 |
| 5 | | | | | | | 11 | 2,500 | 9.6 |
| 6 | | | | | | | 20 | 3,300 | 12.6 |
| 7 | Oxalic Acid | 1.00 | ----do---- | 1.03 | $CO_2$ | 120 | 20 | | |
| 8 | Succinic Acid | 1.00 | ----do---- | 1.03 | $CO_2$ | 210 | 7 | 1,870 | 8.0 |
| 9 | | | | | | | 14 | 3,700 | 15.9 |
| 10 | | | | | | | 21 | 8,400 | 36.1 |
| 11 | ----do---- | 1.00 | Tripropylene Glycol | 1.00 | $CO_2$ | 200 | 7 | 1,720 | 6.2 |
| 12 | | | | | | | 14 | 3,100 | 11.2 |
| 13 | | | | | | | 21 | 4,300 | 15.6 |
| 14 | Pimelic Acid | 1.00 | ----do---- | 1.00 | $CO_2$ | 200 | 8 | 1,520 | 4.8 |
| 15 | | | | | | | 14 | 1,990 | 6.2 |
| 16 | Glutaric Acid | 1.00 | ----do---- | 1.02 | $CO_2$ | 190 | 10 | 1,650 | 5.7 |
| 17 | | | | | | | 18 | 2,750 | 9.6 |
| 18 | ----do---- | 1.00 | Dipropylene Glycol | 1.03 | $CO_2$ | 200 | 8 | 1,110 | 4.8 |
| 19 | | | | | | | 20 | 1,700 | 7.3 |
| 20 | Sebacic Acid | 1.00 | Tripropylene Glycol | 1.03 | $CO_2$ | 190 | 10 | 1,480 | 4.1 |
| 21 | | | | | | | 17 | 2,300 | 6.4 |
| 22 | | | | | | | 24 | 2,920 | 8.1 |
| 23 | Adipic Acid / Phthalic Anhydride | 0.50 / 0.50 | Propylene Glycol / Triethylene Glycol | 0.52 / 0.50 | $CO_2$ | 215 | 6 | | |
| 24 | Diglycollic Acid | 1.00 | Tripropylene Glycol | 1.00 | $CO_2$ | 195 | 6 | vis.=22.4 | Centistokes @ 195° C. |
| 25 | | | | | | | 12 | vis.=44.2 | |
| 26 | Ethylene Bisdiglycollic acid. | 1.00 | Dipropylene Glycol | 1.05 | $CO_2$ | 195 | 14 | vis.=32.3 | Centistokes @ 195° C. |
| 27 | | | | | | | 17 | vis.=41.3 | |
| 28 | Dimeric Linoleic Adipic Acid | 0.33 / 0.66 | Triethylene Glycol | 0.50 | $CO_2$ | 200 | 14 | vis.=23.4 | Centistokes @ 200° C. |
| 29 | | | | | | | 21 | vis.=36.5 | |
| 30 | Diglycollic Acid | 1.00 | Dipropylene Glycol | 1.00 | $CO_2$ | 200 | 8 | vis.=109 | Centistokes @ 200° C. |
| 31 | | | | | | | 16 | vis.=229 | |
| 32 | Succinic Acid | 1.00 | Triethylene Glycol / 1,3 Butylene Glycol | 0.51 / 0.51 | $CO_2$ | 200 | 7 | 2,070 | 10.2 |
| 33 | | | | | | | 14 | 4,900 | 25.1 |
| 34 | | | | | | | 19 | 9,000 | 48.8 |
| 35 | ----do---- | 1.00 | Triethylene Glycol / 2-Ethylhexanediol | 0.52 / 0.51 | $CO_2$ | 190 | 6 | 1,220 | 5.2 |
| 36 | | | | | | | 13 | 3,700 | 16.0 |
| 37 | | | | | | | 18 | 4,000 | 17.3 |
| 38 | ----do---- | 1.00 | Triethylene Glycol / 1,5-Pentanediol | 0.51 / 0.51 | $CO_2$ | 195 | 6 | 1,740 | 8.2 |
| 39 | | | | | | | 12 | 6,010 | 28.6 |
| 40 | ----do---- | 1.00 | Triethylene Glycol | 0.51 | $CO_2$ | 200 | 9 | 1,890 | 7.5 |
| 41 | | | | | | | 8 | 1,815 | 6.0 |
| 42 | Adipic Acid | 1.00 | Dipropylene Glycol | 1.05 | None | 250 | 12 | 2,070 | 6.8 |
| 43 | | | | | | | 14 | 2,100 | 6.9 |
| 44 | | | | | | | 21 | 3,300 | 2.0 |
| 45 | Phthalic Anhydride | 1.00 | Polyethylene Glycol, 1500 Mol. Wt. | 1.03 | $CO_2$ | 200 | 43 | 6,250 | 3.9 |
| 46 | | | | | | | 48 | 7,300 | 4.5 |

In practising the present invention the polyester product employed as a demulsifier is usually added directly to the emulsion to be broken, after which the mixture is agitated or stirred to bring about distribution of the demulsifier and coalescence of the dispersed phase. In some cases, the demulsifier may be dissolved in a suitable solvent, and such solution is then added to the emulsion.

Examples of water-in-oil emulsions which have been found to be resolvable by the polyesters described herein include crude petroleum emulsions, gas tar emulsions, coal tar emulsions, emulsions encountered in the extraction of tar sands, shale oil distillate emulsions, emulsions encountered in the extraction of penicillin and other antibiotics from nutrient broth with organic solvents such as amyl acetate or carbon tetrachloride, emulsions encountered in the doctor sweetening of gasoline, and similar. The present process finds wide scale application, particularly, in the resolution of petroleum emulsions of the water-in-oil type.

As examples of the activity of some of these polyesters as demulsifiers, the following demulsification tests are presented:

Test 1

50 ml. of refrigerated penicillin culture broth acidified to a pH of 2.0, was added to each of two 200 ml. calibrated bottles. 50 ml. of cold amyl acetate was then added to each bottle. 1.0 ml. of a 2% solution of polyester preparation No. 41 (see table) in amyl acetate was then pipetted into the second bottle; both bottles were closed, and then shaken for two minutes in a shaking machine giving 150 oscillations per minute. Finally, the bottles were removed from the shaking machine and allowed to stand quietly at 5° C. After 10 minutes' settling time, the contents of the bottle to which the polyester was added had separated into two clean phases, such that a clear amyl acetate solution could be readily drawn from the spent culture broth. The other bottle exhibited three liquid layers, a thin top layer of clear amyl acetate, an intermediate layer consisting of a creamy emulsion or broth in amyl acetate, and a lower layer of broth.

Test 2

100 ml. of a naturally-occurring, crude petroleum emulsion from the South Houston Field, South Houston, Texas, was placed in a 200 ml. calibrated bottle. To this was added 0.5 ml. of a 1% xylene solution of polyester preparation No. 14, after which the bottle was closed and agitated by shaking for 3 minutes in a shaking machine at the rate of 150 oscillations per minute. The bottle was then removed and placed in a water bath maintained at 90° F. After 5 minutes of settling in the bath, a separation of water and oil phases was apparent, and after 45 minutes of settling a nearly complete separation of water and oil had taken place. The oil layer was carefully pipetted from the water layer, and, on analysis, was found to contain 0.2% water.

Test 3

This test was conducted in the same manner as Test 2, except that a naturally-ocurring petroleum emulsion from Hobbs, New Mexico, was employed. 0.3 ml. of a 1% xylene solution of polyester preparation No. 39 was added to 100 ml. of this emulsion. After shaking and allowing to settle for 45 minutes at 90° F., this sample showed a sharp separation of oil and water phases, yielding an oil which contained only 0.25% water.

Conventional demulsifying agents employed in the treatment of oil field emulsions are used as such, or after dilution with any suitable solvent, such as water, petroleum hydrocarbons, benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of my process.

In practising the present process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduce it into the top of the tank, the demulsifier being added, for example, at the suction side of said circulating pump.

In a second type of treating procedure, the demulsifier is introduced into the well fluids at the well-head, or at some point between the wellhead and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted form into the well and to allow it to come to the surface with the well fluids, and then to flow the chemical-containing emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow, or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons, for convenience, is connected to a proportioning pump which injects the demulsifier drop-wise into the fluids leaving the well. These fluids then pass through the flowline into a settling tank. The settling tank consists of a tank of any convenient size, for instance, one which will hold amounts of fluid produced in 4 to 24 hours (500 barrels' to 2,000 barrels' capacity), and in which there is a perpendicular conduit from the top of the tank to almost the very bottom to permit the incoming fluids to pass from the top of the settling tank to the bottom, and to insure that such incoming fluids do not disturb stratification which takes place during the course of demulsification. The settling tank has two outlets, one below the water level to drain off the water resulting from demulsification, or accompanying the emulsion as free water; the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances, the polyester products herein specified as demulsifiers can be conveniently used without dilution. However, as previously noted, they may be diluted as desired with any suitable solvent. For instance, by mixing 75 parts by weight of a polyester, such as, for example, the product No. 42, with 15 parts by weight of xylene and 10 parts by weight of isopropyl alcohol, an excellent demulsifier is obtained. Selection of the solvent will vary, depending upon the solubility characteristics of the polyester product, and of course, will be dictated, in part, by economic considerations.

As noted above, the products herein described may be used not only in diluted form, but also may be used admixed with some other chemical demulsifier.

The polyester products employed for demulsification will, as previously pointed out, contain some acidic groups which occur as end groups in the polymer. Such acidic end groups are generally left as such, but may, in some cases, be neutralized with inorganic bases such as ammonia, sodium hydroxide and the like, or with relatively low molecular weight amines or quaternary ammonium bases, such as ethyl amine, triethanolamine, cyclohexylamine, propyl pyridinium hydroxide and similar. Similarly, it is obvious that other chemical modifications involving the polymer end groups can be made without greatly altering the properties or effectiveness of the present demulsifiers. For example, carboxyl end groups may be esterified with low molecular weight alcohols, such as ethyl, propyl, or octyl alcohol; and hydroxyl end groups may be esterified with low molecular weight monocarboxy acids, such as acetic, propionic, glycollic, or caprylic acid. The use of such obvious, simple chemical derivatives is intended to be within the scope and spirit of the present invention.

Reference is made to my co-pending application Serial No. 70,812, filed January 13, 1949, directed to certain specific polyesters and their uses.

Having thus described my invention, what I claim as new and desire to secure by Letters Patent is:

1. A process for breaking petroleum emulsions of the water-in-oil type, characterized by subjecting the emulsion to the action of a demulsifier including an organic polyester of a dicarboxylic acid, and a polyhydric alkylene ether glycol in which the alkylene group contains less than 6 carbon atoms, and in which the dicarboxy acid and the polyhydric alcohol residues are linked together by ester linkages.

2. A process for breaking petroleum emulsions of the water-in-oil type, characterized by subjecting the emulsion to the action of a demulsifier including an organic polyester of a dicarboxylic acid, and a poly-1,2-alkylene glycol in which the alkylene group contains less than 6 carbon atoms, and in which the dicarboxy acid and the polyhydric alcohol residues are linked together by ester linkages.

3. A process for breaking petroleum emulsions of the water-in-oil type, characterized by subjecting the emulsion to the action of a demulsifier including an organic polyester of a dicarboxylic acid and a polypropylene glycol.

4. A process for breaking petroleum emulsions of the water-in-oil type, characterized by subjecting the emulsion to the action of a demulsifier including an organic polyester of adipic acid and a polypropylene glycol.

5. A process for breaking petroleum emulsions of the water-in-oil type, characterized by subjecting the emulsion to the action of a demulsifier including an organic polyester of adipic acid and a dipropylene glycol.

6. A process for breaking petroleum emulsions of the water-in-oil type, characterized by subjecting the emulsion to the action of a demulsifier including an organic polyester of adipic acid and a tripropylene glycol.

7. The process of claim 1, wherein the acidic end groups of the polyester have been neutralized by reaction with a member of the group consisting of ammonia, alkali metal hydroxides and amines and quaternary ammonium bases containing less than 9 carbon atoms.

8. A process for breaking petroleum emulsions of the water-in-oil type characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 and 4,000.

9. The process of claim 8 wherein the polybasic acid is diglycollic acid.

CHARLES M. BLAIR, Jr.

REFERENCES CITED

The following references are of record in the file of this patent:

UNITED STATES PATENTS

| Number | Name | Date |
| --- | --- | --- |
| 2,023,976 | Roberts | Dec. 10, 1935 |
| 2,295,164 | De Groote | Sept. 8, 1942 |
| 2,295,169 | De Groote et al. | Sept. 8, 1942 |
| 2,341,846 | Meincke | Feb. 15, 1944 |
| 2,344,980 | De Groote | Mar. 28, 1944 |
| 2,454,808 | Kirkpatrick | Nov. 30, 1948 |